United States Patent [19]
Lewis

[11] Patent Number: 5,666,237
[45] Date of Patent: Sep. 9, 1997

[54] METHOD FOR MAPPING THERMAL ASPERITIES OF A MAGNETIC RECORDING SURFACE IN DATA STORAGE DEVICE

[75] Inventor: William D. Lewis, Northborough, Mass.

[73] Assignee: Quantum Corporation, Milpitas, Calif.

[21] Appl. No.: 678,387

[22] Filed: Jun. 28, 1996

Related U.S. Application Data

[62] Division of Ser. No. 444,533, May 19, 1995, Pat. No. 5,537,034.
[51] Int. Cl.[6] ............................................. G11B 21/02
[52] U.S. Cl. ........................... 360/75; 324/212; 360/72.1; 360/73.03
[58] Field of Search ............................ 360/72.1, 73.01, 360/73.03, 103, 137, 97.02, 71, 75, 70, 69; 324/212, 211, 210

[56] References Cited

U.S. PATENT DOCUMENTS

| | | | |
|---|---|---|---|
| 4,384,311 | 5/1983 | McNeil | 360/128 |
| 5,150,050 | 9/1992 | Genheimer et al. | 324/212 |
| 5,233,482 | 8/1993 | Galbraith et al. | 360/46 |
| 5,309,303 | 5/1994 | Hsai et al. | 360/103 |
| 5,410,439 | 4/1995 | Egbert et al. | 360/75 |
| 5,537,034 | 7/1996 | Lewis | 324/212 |

*Primary Examiner*—Andrew L. Sniezek
*Attorney, Agent, or Firm*—David B. Harrison; William J. Kubida; Debra A. Chun

[57] ABSTRACT

In a disk drive, the tendency of a flying head to physically engage a constant-speed data recording disk when the drive is operated at an altitude higher than the altitude at which the drive was manufactured is tested by. During manufacture of the drive, the constant disk speed is reduced to a lower speed that is a function of a mathematical relationship between the manufacturing altitude to the higher altitude. The invention then determines if the head in fact physically engages the disk at this lower speed. In an embodiment, this lower speed is calculated as a function of the ratio of the manufacturing altitude to the higher altitude. An embodiment of the invention provides a rotatable rigid magnetic recording disk and a magneto-resistive (MR) head that is generally stationary relative to the rotating disk.

17 Claims, 5 Drawing Sheets

METHOD FOR MAPPING THERMAL ASPERITIES OF A MAGNETIC RECORDING SURFACE IN DATA STORAGE DEVICE

This is a divisional of copending application Ser. No. 08/444,533 filed on May 19, 1995, now U.S. Pat. No. 5,537,034.

BACKGROUND OF THE INVENTION

1. Field of the Invention

This invention relates to the field of data processing or data recording, and more specifically to data recording devices that transduce data relative to a recording media by operation of a flying head or transducer.

2. Description of the Related Art

As is well known in the data processing art, one form of data memory device comprises one or more moving recording surfaces upon which binary data is written, and/or from which binary data is read by the use of a data transducer or head that is constructed and arranged to fly over the recording surface with very close physical spacing thereto. An undesirable head crash occurs when the head physically engages the recording surface. Many well known types of head sliders have been originated to optimize the performance of such a flying head and to reduce the occurrence of a head crash.

As will be appreciated, state of the art flying heads generally tend to fly a greater distance above the recording surface when the surrounding air density is increased. Thus, for any given flying head memory device the tendency for the head to crash increases as the memory device is operated at lower air densities such as exists at higher and higher altitudes. In appreciation of this fact, manufacturers generally specify a maximum altitude at which operation of the flying head device is recommended.

While a head crash is generally undesirable in any type of rotating memory device, a particular problem exists in the type of rotating memory device that comprises one of more rigid magnetic recording disks having flying magneto-resistive (MR) heads associated therewith. With this type of device, a head crash generates heat that can be incorrectly interpreted as binary data read from the disk. U.S. Pat. No. 5,233,482, incorporated herein by reference for the purpose of indicating the background of the present invention and illustrating the state of the art, discusses the thermal asperity problem that can occur when a flying magneto-resistive head mechanically collides with a protrusion on the surface of a adjacent disk. In this patent, detection of a thermal asperity causes a thermal asperity data detection mode of operation to be established. Thermal aspirates are detected by sensing a shift in the baseline of the head's read signal.

The use of MR heads in magneto resistive disk memory products can cause a significant problem relative to meeting hard error data rate manufacturing specifications over an altitude range that is specified for the products. In particular, it has been found that media aspirates or high spots that fall just below the height at which the head flies shows no problem during manufacture at generally lower altitudes. However, when the products are later operated at high altitude, the head flies lower, and the head may now physically contact the media's asperity, causing a thermal asperity transient to occur in the head. This transient often causes an unrecoverable, or hard read, error to occur in the head's read signal.

While prior devices have to some extent dealt with the problem of head crashes, and with the problem of thermal asperity in MR head devices, the need remains in the art to provide an apparatus and method whereby testing or other operation of a flying head device will reliably operate to ensure future operation of the device at a known high altitude.

SUMMARY OF THE INVENTION

This invention provides a means whereby the flying height of a head is margined during manufacturing test. Thermal asperities that would normally be seen only at high altitudes, such as 10,000 feet, are detected and are eliminated from customer use by rejecting devices in which the thermal asperities or thermal transients are detected, or by marking such media areas for nonuse during data processing.

More specifically, this invention provides a method and an apparatus whereby the propensity of an air bearing flying head to crash is detected as a function of the relationship between (1) the air pressure that exists at the time of device manufacture, and (2) a lower air pressure that is representative of a higher altitude at which future operation of the device is recommended or allowed.

In a preferred embodiment of the invention, one or more rigid magnetic recording disks and one or more magneto-resistive (MR) heads are operable associated to form a rotating magnetic memory device, sometimes known as DASD.

While the invention will be described relative to an embodiment thereof in which a flying MR head and a rigid rotating magnetic recording disk cooperate in a data transducing relationship, the spirit and scope of the invention is not to be limited thereto. For example, the invention finds equal utility relative to a magnetic or optical recording head that flies relative to a linearly moving or a rotationally moving magnetic or optical recording surface.

The invention will be described relative to an embodiment thereof in which a head crash, and the resulting thermal asperity of an MR head, is detected by performing a data drop out test relative to the head's read signal. However, the invention is not to be limited thereto since those skilled in the art will readily visualize yet other means of detecting a head crash that are within the spirit and scope of the invention.

More specifically, the present invention provides for detecting the likelihood that a flying head will crash into an adjacent recording surface at an altitude that is higher than the device's manufacturing altitude, wherein a head flying condition equivalent to the ability of the head to fly at a the higher altitude is simulated, and then determining if a head in fact crashes during this simulation.

In an embodiment of the invention, during the simulation step, the speed of the recording media is reduced to a lower speed that is a function of the relationship of (1) the device's manufacturing altitude to (2) the higher altitude, and more specifically a function of the ratio of (1) the manufacturing altitude to (2) the higher altitude.

Since the above-described head thermal asperities or transients make it very difficult, and often impossible to recover data from the disk, especially when the disk asperity is associated with critical disk areas such as the data sync field, a valuable utility of the invention is to locate the disk areas having such asperities during manufacture, whereupon these disk areas are retired and eliminated from future possible use by the customer.

The present invention provides a new and unusual means of detecting and replacing disk block areas that have critical-height asperities by flying the head lower during a portion of a manufacturing test process; i.e., fly-height margining is added to a conventional disk drive test procedure.

In an embodiment of the invention, during testing for disk asperities that will likely produce a hard error problem at a high altitude, such as 10,000 feet, the disk's spindle speed was margined to be about ⅔ of the spindle's normal operational speed, for example 3602 RPM as compared to 5403 RPM. However, the invention is not to be limited thereto, since the invention finds utility relative to other RPM ratios that operate to provide a desired fly-height margin.

As will be apparent to those of skill in the art, the present invention provides an almost zero-cost means of providing fly-height margining, without the need for testing in a costly altitude chamber. Improved data integrity and customer satisfaction are provided for disk drives that are tested in accordance with the invention. In addition, the invention provides for the early detection of manufacturing problems, such as tiny merge scratches of the disk surface, which problems may not be detected during a conventional manufacturing test process.

These and other objects, advantages and features of the invention will be apparent to those of skill in the art upon reference to the following detailed description of the invention, which description makes reference to the drawing.

DESCRIPTION OF THE PREFERRED EMBODIMENT

It is to be understood that the details of construction and arrangement of a disk drive data memory device with which the present invention finds utility are not critical to the spirit and scope of the invention. All that is necessary in accordance with the invention is that such a disk drive have a flying head whose data transducing integrity is dependent upon the absence of a head-to-disk crash occurring during head-to-disk data transducing of data.

Figure 1:
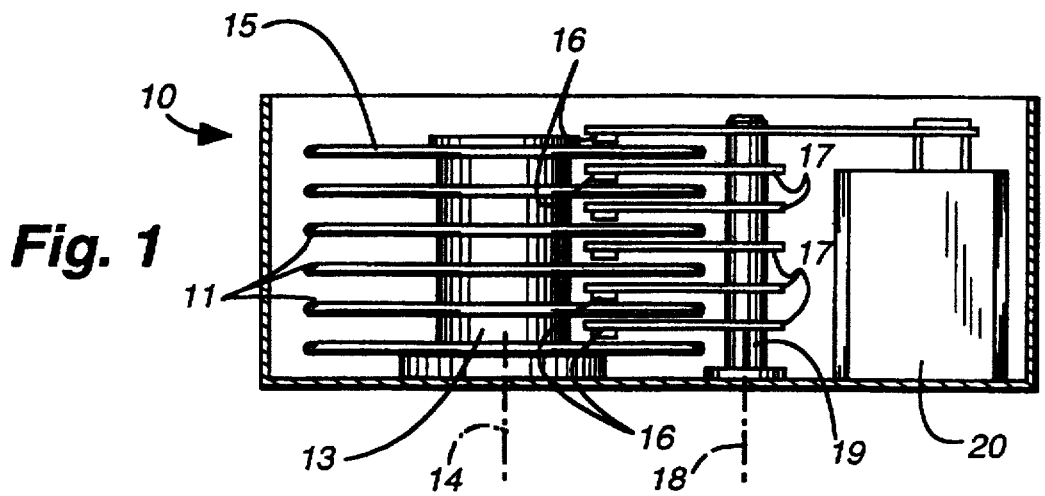
FIG. 1 is a side view of a disk drive or file incorporation the present invention.
Figure 2:
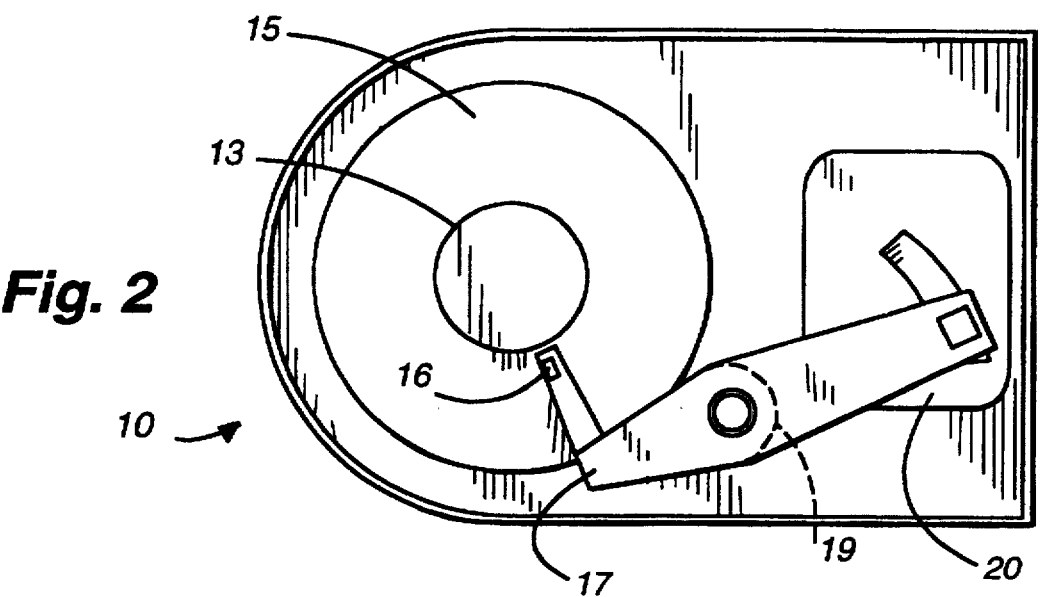
FIG. 2 is a top view of the disk drive shown in FIG. 1.

FIGS. 1 and 2 are simplified views of an exemplary disk drive, or file 10, that incorporates the present invention; i.e., disk file 10 is of the general type to be tested and/or operated by virtue of the present invention.

Disk drive 10 includes a stack of rigid magnetic recording disks 11 that are mounted on spindle and motor assembly 13 so as to occupy parallel planes. Disks 11 and assembly 13 rotate about an axis 14 by virtue of a motor control means that will be described.

The planar surface 15 of each of the six disks 11 cooperates in data transducing relation with one of six flying heads 16 that are of conventional and noncritical construction well known to those of skill in the art. As is conventional, heads 16 are carried by flexure springs (not shown) that are portions of six movable arms 17. Arms 17 are ganged together for unitary pivotal movement about the axis 18 of head-support spindle 19.

Selective and controlled rotation of head-support spindle 19 is effected by energization of rotary actuator 20 of conventional and well known design. In this way, heads 16 are selectively moved to a desired data cylinder that is defined by the alignment of like data tracks of the six disks 11. This component of head-to-disk movement is generally radially of disks 11 and is under the control of an associated data processing unit (not shown), as is well known.

Disks 11 are rotated at a constant speed or RPM by operation of spindle motor assembly 13. For example, the rated speed of disks 11 is a constant 5400 RPM during data processing; i.e., during the writing of binary data to disks 11 and during the reading of binary data from disks 11.

In a preferred embodiment of the invention, heads 16 are flying magneto-resistive (MR) heads of conventional flying slider construction, wherein heads 16 fly a few microinches above disk surfaces 15 when spindle motor assembly 13 operates to rotate disks 11 at 5400 RPM at sea level.

Figure 3:
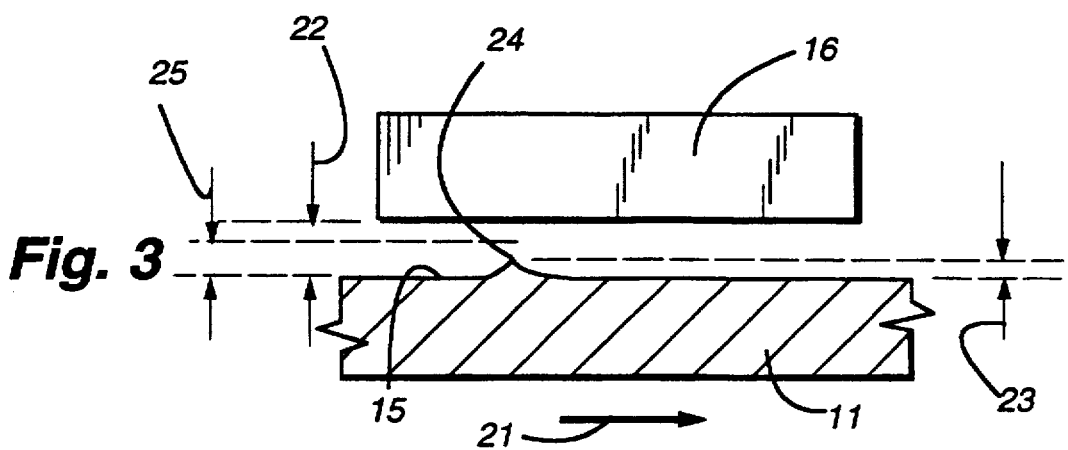
FIG. 3 is an exemplary showing of one of the disk drive's heads in data transducing relation with the surface of a disk, with the head being shown at various flying heights relative to a disk asperity.

FIG. 3 shows one of the disk drive's heads 16 in transducing association with the recording surface 15 of a disk 11. In FIG. 1, relative movement between head 16 and disk 11 is represented by arrow 21. Movement 21 occurs by virtue of rotation of disk 11 relative to stationary head 16. However, this specific head/media movement relationship is not to be considered a limitation on the spirit and scope of the invention, nor is the use of a recording disk, as distinguished, for example, from the use of recording tape, to be considered a limitation on the invention.

Disk 11 in this embodiment is a rigid or hard magnetic recording disk, and head 16 is an MR head that flies over disk surface 15 by virtue of an air bearing that is established by operation of movement 21; i.e., by virtue of the fact that disk 11 is rotating at 5400 RPM relative to stationary head 16.

When disk 11 is moving at its rated data processing RPM of 5400 and at sea level, head 16 flies over disk surface 15 with a physical spacing that is represented by dimension 22. Reference numeral 24 represents a small asperity on disk surface 15. As can be seen, during data processing or manufacturing test of the disk drive at 5400 RPM and at sea level, asperity 24 does not physically engage head 16, and even when the disk drive is operated or manufacture-tested at 5400 RPM at a higher altitude, such as for example 5,000 feet, head 16 still successfully flies over asperity 24, as is shown by dimension 25.

Assuming that the disk drive has been rated for use as high as 10,000 in altitude by its manufacturer, dimension 23 is a representation of how the air bearing that is then created between head 16 and disk surface 15 at the disk's rated RPM of 5400 is no longer stiff enough to prevent a collision between head 16 and disk surface 15.

The present invention facilitates early detection of a future high altitude data processing problem that will likely be caused by small air bearing dimension 23 and disk asperity 24.

More specifically, the invention provides that during manufacture-testing at an altitude that is less than the exemplary highest operating altitude of 10,000 feet (and perhaps periodically during data processing at an altitude that is less than 10,000 feet), disk 11 is operated in accordance with this invention at a lower RPM (for example, at 3600 RPM) in order to simulate actual operation of the disk drive at 10,000 feet. At this lower speed, the head-to-disk air bearing is reduced in strength, and head 16 flies over disk surface 15 with the smaller spacing 23, just as it actually would at rated RPM and at 10,000 feet.

By monitoring the electrical output signal of head 16 during this special low speed situation, a collision between head 16 and disk surface 15 can be detected. When such a collision is detected, disk 11 can be discarded, or disk 11 can be formatted such that the physical location of asperity 24 on disk surface 15 is not thereafter used for the storage of data during data processing. Future operation at the disk drive's highest rated altitude will now be reliable.

With reference to FIG. 2, it is known that relative movement 21 is of a somewhat lower magnitude at the inner diameter data tracks of disk 11 than it is at the disk's outer diameter data tracks. However, the above description of the various head flying height conditions 22,23,25 is generally valid for all data tracks, from the disk's inner diameter to the disk's outer diameter.

The exact detail of construction of the motor controller or control means and the read channel means whereby the above-described test RPM is selectively imposed upon disks 11, and whereby a head crash is detected, if one occurs during this test RPM mode, is not to be considered a limitation on the broad spirit and scope of the present invention.

Figure 4:
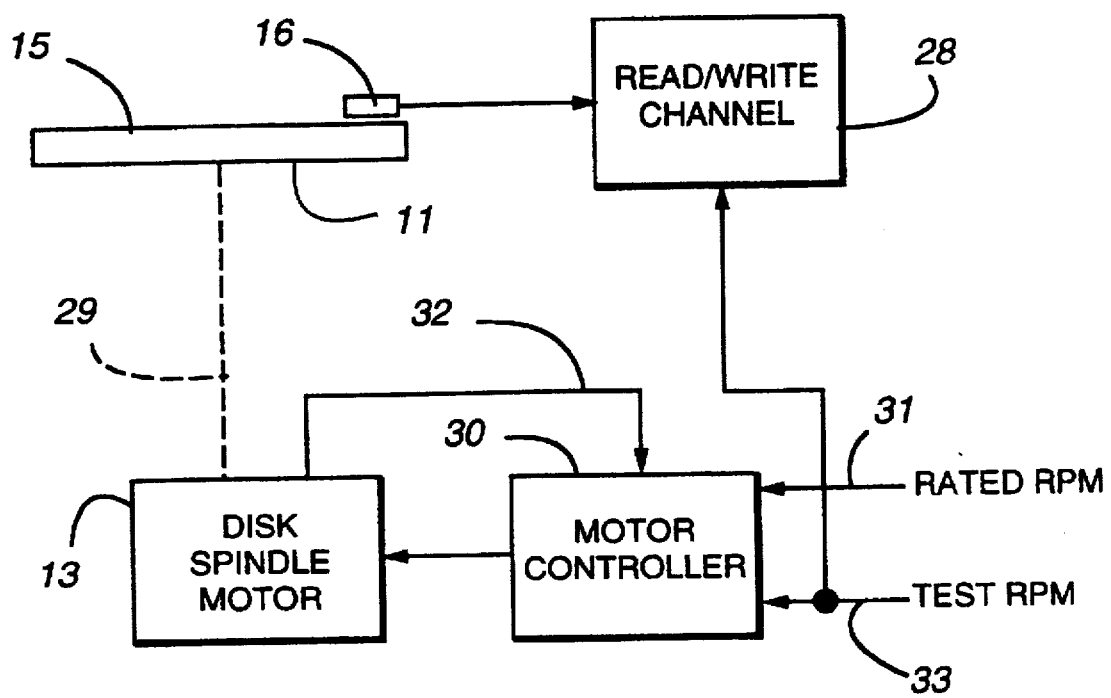
FIG. 4 shows one form of the invention wherein a spindle motor controller is used to control the rotational speed or RPM of the disk spindle motor of FIG. 1.

FIG. 4 is a showing of one form of such a spindle motor controller 30 and read/write channel 28. In this arrangement, an input control signal 31 operates to ensure that disk spindle motor 13 causes disks 11 to rotate at the rated data processing RPM, both during conventional manufacture-testing of the disk drive, and later during data processing by the disk drive. If desired, a motor speed feedback signal 32 may be provided to controller 30 in order to aid in maintaining the disk RPM constant.

Spindle motor 13 is mechanically connected to rotate disk 11, as is indicated by broken line 29. Flying air-bearing head 16 is associated in transducing relation with the recording surface 15 of disk 11, and the output signal of head 16 is connected to read/write channel 28.

When it is desired to invoke the present invention, input control signal 31 is replaced by input control signal 33. Signal 33 operates to cause controller 30 to reduce the speed of spindle motor 13 as a function of the relationship of the disk drive's manufacturing altitude to the maximum altitude at which the disk drive is rated for data processing operation. A nonlimiting example of such a ratio is 5,000 feet to 10,000 feet, or ½.

Within the spirit and scope of the present invention the speed of spindle motor 13 is usually not reduced as a direct function of this ratio; i.e., by an exemplary ½. However, with certain disk-to-slider configurations reducing the spindle motor speed as a direct function of this ratio may be necessary. Whatever speed reduction function is used, the effect of the speed reduction function that is implemented by signal 33 is to simulate at the lower manufacturing altitude (in this example 5,000 feet) the lower flying height 23 that will occur at the disk's rated RPM when the disk drive is operated at its highest rated altitude (in this example 10,000 feet).

Read/write channel 28 operates to read data from the disk's recording surface 15 during both the rated RPM mode of operation and the test RPM mode of operation of motor 13 and disk 11. As is well known, read/write channel 28 is constructed and arranged to inherently read data at the rated RPM. Thus, in accordance with a feature of the invention, read/write channel 28 is provided with a control signal input 33 that enables read/write channel 28 to successfully read data at the lower test RPM.

Figure 5:
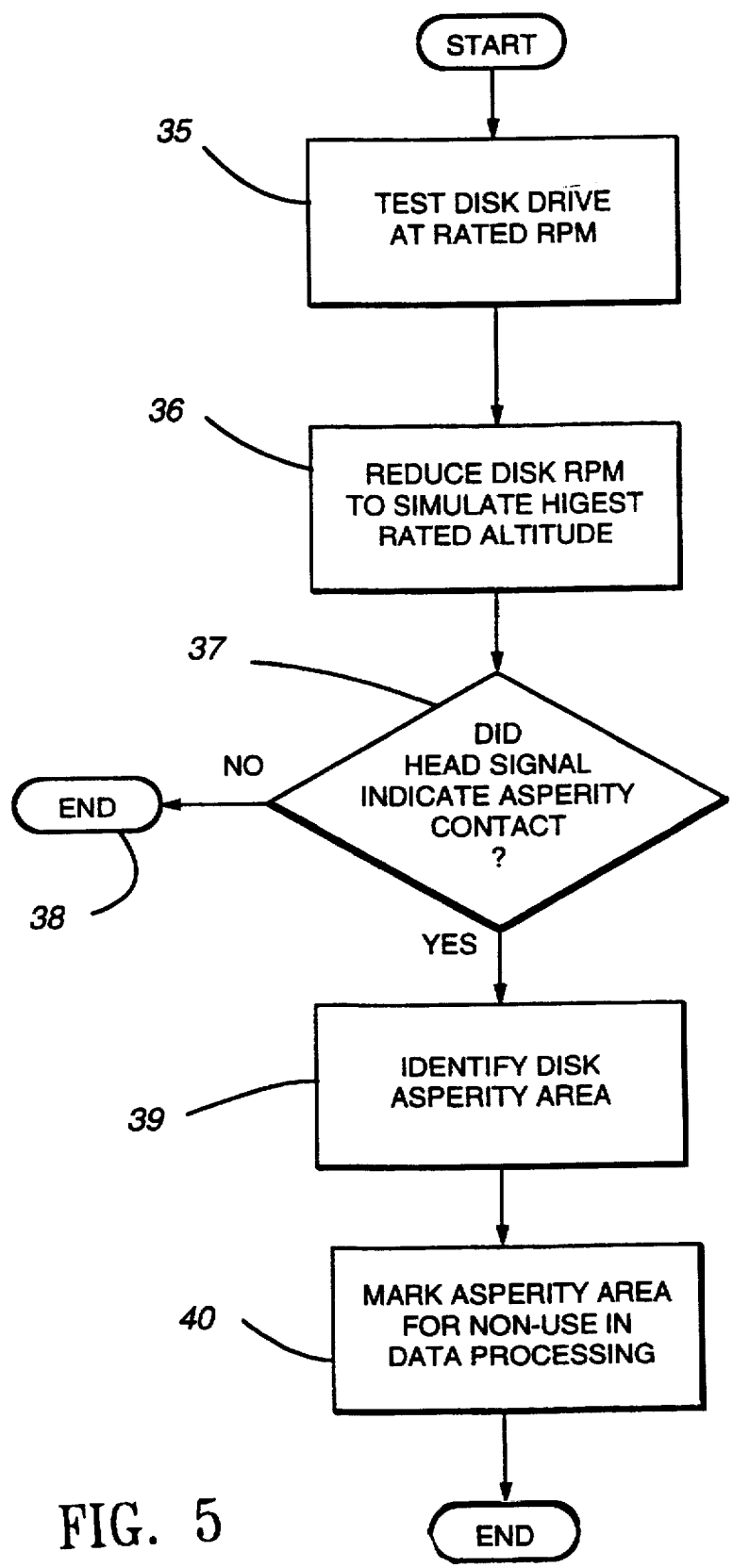
FIG. 5 is a flowchart showing of one form of the invention in relation to FIG. 4.

FIG. 5 is a flowchart that shows of one form of operation of the spindle motor and read/write channel portions of this invention in relation to the device of FIG. 4. In this method of operation, the disk drive is first tested in a conventional manner at its rated RPM, as is indicated by function 35. Testing 35 usually occurs at an altitude that is lower than the disk drive's highest rated altitude. In the art, the fully tested disk drive would now be released for data processing operation.

In accordance with the invention, the disk speed is now reduced to simulate operation at the disk drive's highest rated altitude, as is indicated by function 36. Thereafter, decision function 37 operates to monitor read/write channel 28, and more specifically the output signal of head 16, in order to detect if and when an asperity contact, or a head-to-disk crash occurs at this lower disk speed. If no asperity contact is detected, the disk drive is released for data processing operation as is indicated at 38.

When an asperity contact is detected by decision function 37, the disk could be replaced, or function 39 can operate to identify the physical area of disk surface 15 that contains the asperity. In this case, function 40 thereafter marks the disk's identified asperity area to insure that the asperity area will not be used for later data processing. In this way, future reliable data processing at the disk drive's highest rated altitude is ensured.

Without limitation thereto in an embodiment of the invention, decision function 37 was accomplished by using head 16 to read a known data pattern that had previously been written on disk 11. In function 38, read data errors that are over a selected threshold level are used to identified the data blocks of the known data pattern within which a head crash occurred in the environment of the low disk RPM of function 36. Defining the above-mentioned error threshold usually comprises defining a burst error of a given length, but an error threshold can be defined in other manners, such as 5 bits in error within a known data block.

Without limitation thereto, function 40 may comprise utilizing in data processing a spare data block(s) within a data track in which a head crash has been detected by functions 37,39, and formatting the disk so that the offending data block(s) that are identified by function 39 are not thereafter used in data processing.

Figure 6:
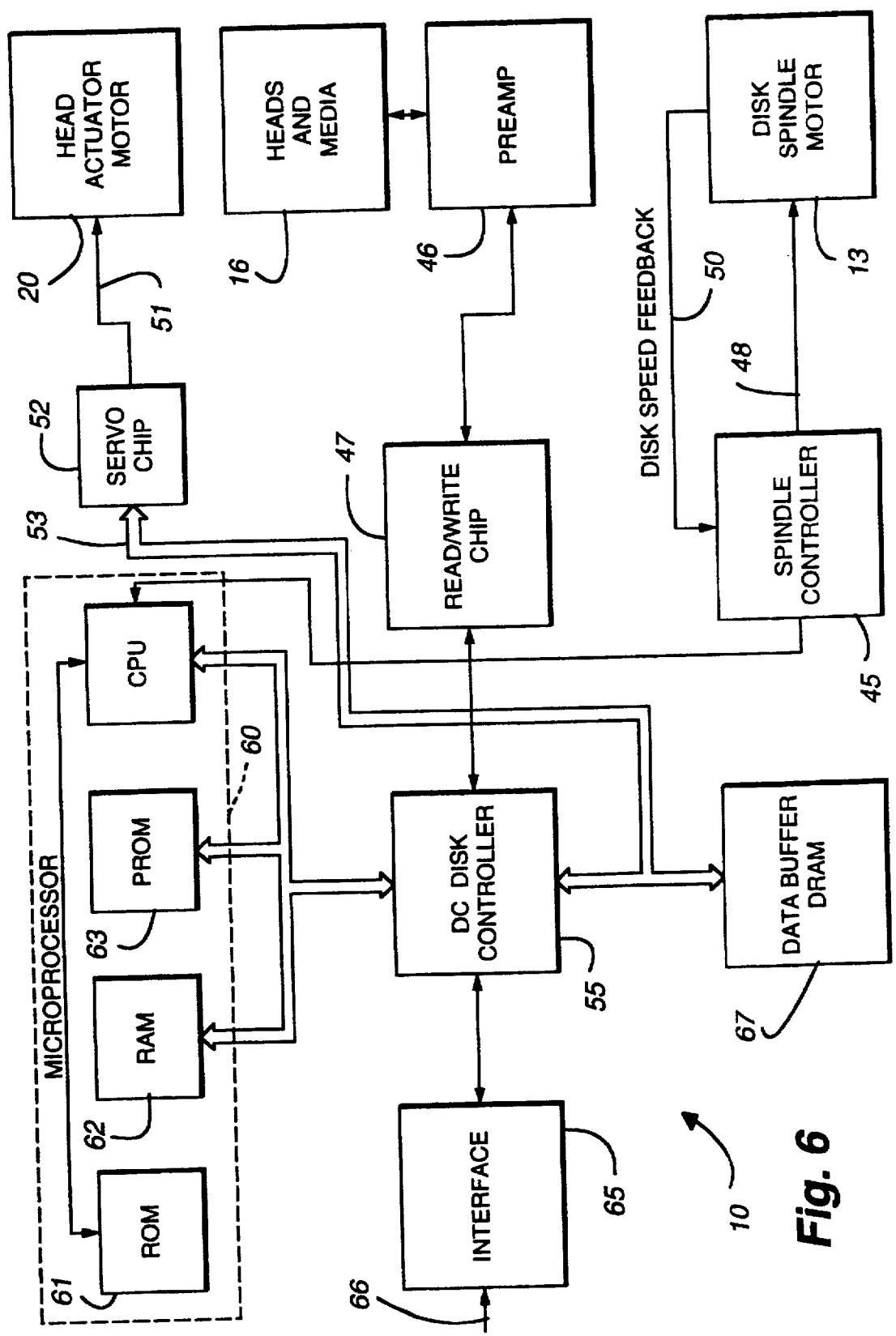
FIG. 6 shows another form of the invention that includes a spindle motor and motor controller, a heads and media assembly and an actuator motor for the heads, and a rear/write circuit for the heads and media assembly.

FIG. 6 shows in block diagram form the mechanical and the electronic portions of a disk drive that embodies the invention.

At the right hand portion of the figure, flying heads and media assembly 16, an actuator motor 20 for the heads that are within assembly 16, a head signal pre-amp 46, and a read/write circuit 47 for reading/writing data relative to the disks that are within assembly 16 are shown. As is well known, the heads of assembly 16 read the data patterns that are recorded on the disks of assembly 16. As can be appreciated, the accurate and reliable reading and writing of data by the heads presumes and requires a known and constant operational RPM of the disks.

Head actuator motor 20 is controlled by output 51 of a servo controller chip 52 of generally well known and noncritical design having a power amplifier and a D/A converter. A digital input 53 is applied to controller 52, which in turn provides an analog output 51 to motor 20.

Disk spindle motor 13, which is of the types generally used in disk drives, is controlled in a well-known manner by output 48 of a spindle controller 45. Controller 45 preferably receives a disk speed feedback signal 50. Signal 50 may comprise the sensing of the back EMF of motor 13, in a well-known manner.

Spindle motor controller 45 is controlled by microprocessor 60 so as to normally produce the above- mentioned known and constant operational disk high RPM. At this operational RPM, the heads that are within assembly 20 are constructed and arranged such that within a range of altitudes from a low altitude to a high altitude, the heads' air bearings will produce reliable flying of the heads over the disk's recording surfaces.

However, within the teachings of this invention, motor controller 45 is selectively controlled so as to impose a lower-than-operational RPM on disk spindle motor 13, so as to stress the ability of the head air bearings to support the heads over the disk's recording surfaces.

An example of the utility of this feature of the invention is when the disk drive is manufactured at an altitude that is lower than the above-mentioned high operational altitude, this being the manufacturing situation that is normally found in the art. In this utility of the invention, motor controller 45 is selectively operable during the lower altitude manufacturing test procedure to impose the above- mentioned lower-than-operational RPM on disk spindle motor 13 so as to stress the ability of the head air bearings to continuously and reliably support the heads over the disk's recording surfaces, thereby simulating the operating condition that may exist at a later time if the disk drive is operated at the above-mentioned high altitude.

Without limitation thereto, read/write chip or circuit 47 comprises an analog chip (AC) that includes an A/D convertor for receiving an output signal from the head(s), as well as a disk-track position detector. As is well known, read/write circuit or channel 47 is constructed and arranged to inherently read and write data relative to a disk when the disk is rotating at its rated or operational RPM. As a feature of the invention, read/write channel 47 is selectively controlled by disk controller 55 under the control of microprocessor 60, so as to enable the heads to reliably read this same data pattern from the disks when the disk is rotated at the above-mentioned lower-than-operational RPM. Any inability of the head air bearings to support the heads over the disk recording surfaces at this lower-than-operational RPM is detected by monitoring the head read signals; for example, monitoring for a signal dropout, during the period of the lower-than-operational disk RPM.

The electronics portion of the disk drive includes the above-mentioned microprocessor 60 having a ROM 61, a RAM 62, a programmable ROM 63, and a processor chip (CPU) 64. Programmable ROM 63 contains the microprocessor firmware that controls the operation of the disk drive.

In a nonlimiting embodiment of the invention, when it is desired to impose the above-described lower RPM on disk spindle motor 13, and to additionally impose the ability to read data at this lower RPM on read/write circuit 47, this firmware portion of ROM 63 is reloaded with program code that effects these two end results.

Interface or channel 65 provides communication between the disk drive of FIG. 6 and a data processing device (not shown) in a well known manner, as is indicated by input/output bus 66. Interface 65 delivers signals to, and receives signals from, digital or DC disk controller 55, this controller having a data buffer RAM 67 at its disposal.

Figure 7:
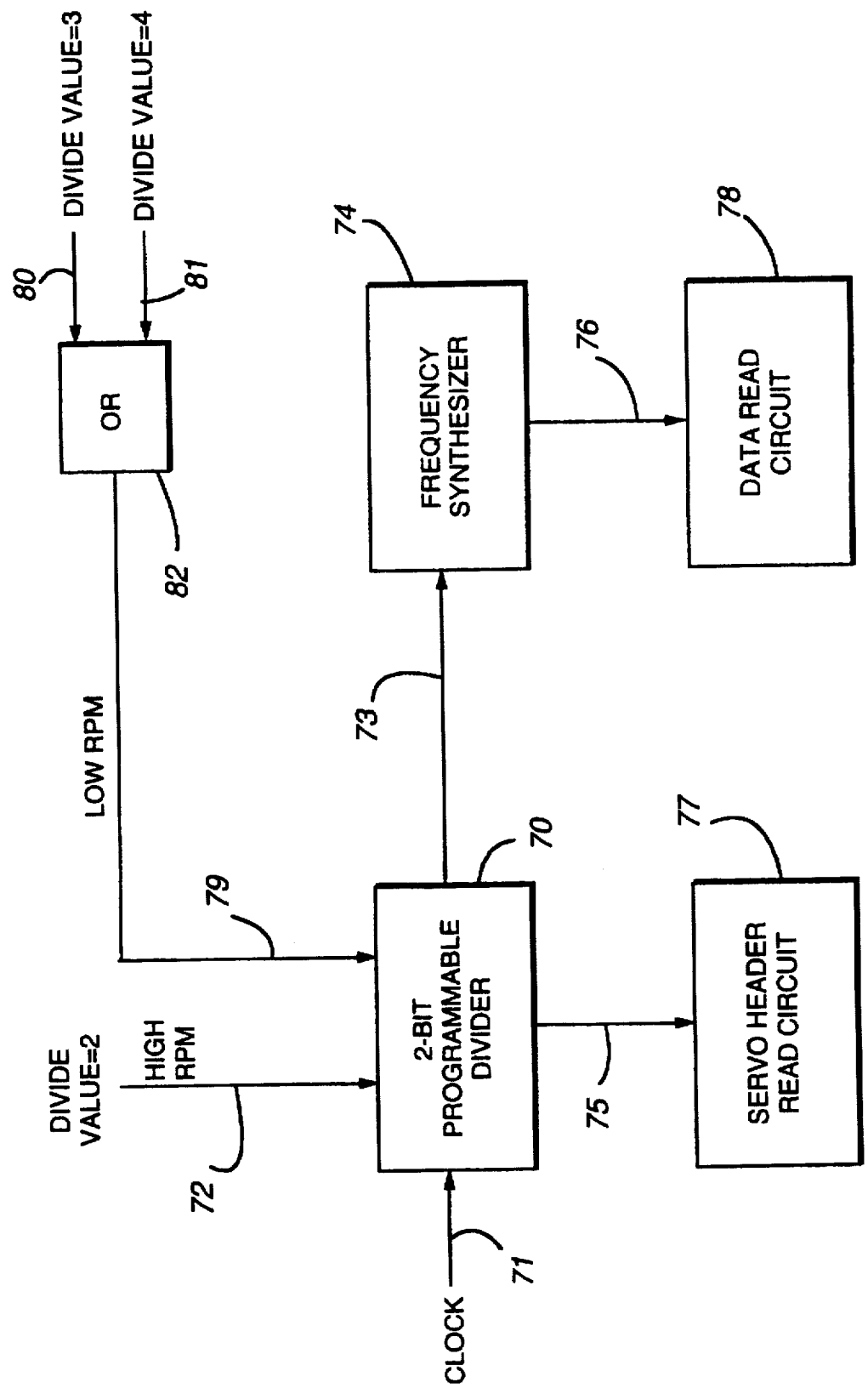
FIG. 7 shows one form of a circuit means whereby the read/write circuit of FIG. 6 is selectively enabled to accurately and reliably read the disk track servo header and data portions at a normal high RPM and at one of two selectable lower RPMs.

FIG. 7 shows one form of a circuit means whereby read/write circuit 47 of FIG. 6 is selectively enabled to accurately and reliably read the disk track servo header and data portions at a normal high RPM and at one of two selectable lower RPMs. For example, the circuit means of FIG. 7, or at least its function, may be incorporated within disk controller 55 of FIG. 6. In the FIG. 7 embodiment of the invention, a disk format is presumed having an imbedded servo architecture wherein a servo header is provided for every disk track.

In this construction and arrangement, a 2-bit programmable divider 70 receives a clock input 71. At the normal high operational disk RPM of 5400, input 72 controls divider 70 so as to divide clock 71 by 2. In this normal disk drive operational state, an output 73 from divider 73 controls frequency synthesizer 74 in a first manner. Outputs 75 and 76 now control servo header read circuit 77 and data read circuit 78 to accurately and reliably read the disk track servo header and data portions at the normal high RPM.

When it is desired to stress the ability of the head(s) to fly at a higher altitude, low RPM input 79 to divider 70 is selectively operable. In this embodiment of the invention, input 79 can receive one of two low RPM command inputs 80 or 81, perhaps by way of an OR function 82. As will be appreciated, inputs 80,81 are enabled as spindle motor 13 of FIG. 6 is controlled to produce a corresponding change in disk RPM.

Input 80 provides that divider 70 will divide by the value 3, thus being equivalent to a ⅔ reduction in disk RPM by spindle motor 13; i.e., from 5400 RPM to 3600 RPM. Input 81 provides that divider 70 will divide by the value 4, this being equivalent to a ½ reduction in disk RPM by spindle motor 13; i.e. from 5400 RPM to 2700 RPM. Of course, input 81 provides a greater flying height stress than does input 80.

Again, outputs 75 and 76 now control servo header read circuit 77 and data read circuit 78 at the lower disk RPMs so as to accurately and reliably read the disk track servo header and data portions at these lower RPMs.

Without limitation thereto, divide-by input signals 72,80, 81 may originate from the above-mentioned firmware that is loaded into ROM 63 of FIG. 6.

The invention has been described in detail while making reference to various embodiments thereof. However, it is known that when others skilled in the art learn of this invention, they will readily visualize yet other embodiments that are within the spirit and scope of the invention. Thus, this detailed invention is not to be taken as a limitation on the spirit and scope of the invention.

What is claimed is:

1. A moving-media data storage device, comprising:
   data storage media having a data pattern recorded thereon,
   a flying data transducer associated in data transducing relation with said media,
   an electric motor connected to move said media at a generally constant speed in accordance with an electrical energization parameter of said motor, first means for energizing said motor at a first energization parameter to facilitate data processing by said transducer, and second means for energizing said motor at a second energization parameter to reduce said motor speed and thereby stress the ability of said transducer to fly relative to said media, the moving-media data storage device further including circuit means connected to said transducer and responsive to a signal that is generated by said transducer when said motor is energized at said second parameter, said circuit means being constructed and arranged to respond to a signal indicative of at least a periodic inability of said transducer to fly relative to said media when said motor is energized at said second parameter, the circuit means comprising:

a clock a divider circuit connected to receive said clock as an input and having an output, a first divide-by command input to said divider circuit enabling said divider circuit to divide said clock by a first factor, a second divide-by command input to said divider circuit enabling said divide circuit to divide said clock by a second factor which is higher than said first factor, means connecting said output of said divider circuit in controlling relation to said circuit means, said first divide-by factor enabling reading of said data pattern at a first RPM, and said second divide-by factor enabling reading of said data pattern at a second RPM.

2. The device of claim 1 wherein said second means is constructed and arranged to simulate operation of said device at a high altitude.

3. The device of claim 1 wherein said media is a magnetic recording disk, and wherein said transducer is a flying MR head having an air bearing characteristic that is altitude sensitive, wherein said first parameter produces rotation of said disk at a high RPM, and wherein said second parameter produces rotation of said disk at a low RPM simulating a head air bearing characteristic that is generally equivalent to said high altitude.

4. The device of claim 3 wherein said MR head is generally stationary relative to said rotating disk.

5. The device of claim 4 including a plurality of flying MR heads individual associated with a like plurality of rigid rotating disks.

6. A disk file, comprising:

a magnetic recording disk having a data pattern recorded thereon an air-bearing read/write head flying in data processing relation with said disk, a motor connected to rotate said disk at a generally constant speed in accordance with a motor energization parameter, first means for energizing said motor with a first parameter to facilitate said data processing, second means for energizing said motor with a second parameter in order to reduce said speed of said motor and disk, thereby stressing the ability of said head to fly relative to said disk, a data circuit connected to said head and operable to read a signal that is generated by said head as said head reads said data pattern, the data circuit being responsive to a signal that is generated by said head when said motor is energized at said second parameter, said data circuit being constructed and arranged to respond to a signal indicative of at least a periodic inability of said head to fly relative to said media when said motor is energized at said second parameter, control means connected to said data circuit and operable to facilitate reading of said data pattern at said reduced speed of said motor and disk, the control means comprising:

a clock, a divider circuit connected to receive said clock as an input and having an output, a first divide-by command input to said divider circuit enabling said divider circuit to divide said clock by a first factor, a second divide-by command input to said divider circuit enabling said divide circuit to divide said clock by a second factor which is higher than said first factor, and means connecting said output of said divider circuit in controlling relation to said data circuit, said first divide-by factor enabling reading of said data pattern at a first RPM, and said second divide-by factor enabling reading of said data pattern at a second RPM.

7. The disk file of claim 6 wherein said second means is constructed and arranged to simulate operation of said disk file at a high altitude, and wherein said data circuit is normally operable to read said data pattern at said data processing speed of said motor and disk.

8. The disk file of claim 7 wherein said circuit means is constructed and arranged to respond to a head signal indicative of a general inability of said head to fly relative to said disk when said motor is energized with said second parameter.

9. The disk file of claim 6 wherein said head is an MR head having an air bearing characteristic that is altitude sensitive, wherein said first parameter produces rotation of said disk at a high RPM, and wherein said second parameter produces rotation of said disk at a low RPM simulating an air bearing characteristic for said head that is equivalent to said high altitude.

10. The disk file of claim 9 wherein said MR head is generally stationary relative to said rotating disk.

11. The disk file of claim 10 including a plurality of said MR heads individual associated with a like plurality of said rigid rotating disks, a like plurality of said data circuits connected one to each of said plurality of heads, and a like plurality of said control means connected one to each of said plurality of data circuits.

12. A disk drive comprising:

a recording disk having a data pattern thereon, a spindle motor connected to rotate said disk at a generally constant RPM in accordance with a motor energization parameter that is applied thereto, an air-bearing read head flying in data transducing relation with said disk, a data circuit connected to said head and operable to read a signal that is generated by said head as said head reads said data pattern in accordance with a data circuit parameter that is applied to said data circuit, a microprocessor connected to provide said motor energization parameter to said spindle motor, and including means to provide said data circuit parameter to said data circuit, the means comprising:

a clock, a divider circuit connected to receive said clock as an input and having an output, a first divide-by command input to said divider circuit enabling said divider circuit to divide said clock by a first factor, a second divide-by command input to said divider circuit enabling said divide circuit to divide said clock by a second factor which is higher than said first factor, and means connecting said output of said divider circuit in controlling relation to said data circuit, said first divide-by factor enabling reading of said data pattern at a first RPM and said second divide-by factor enabling reading of said data pattern at a second RPM, said microprocessor including a processing unit connected to a memory means, said memory means enabling said microprocessor to control said spindle motor and said data circuit in accordance with a motor energization parameter and a data circuit parameter that is contained in said memory means, first means for loading said memory means with first control parameters enabling rotation of said disk at said first RPM, and enabling reading of said data pattern at said first RPM, and second means for loading said memory means with second control parameters enabling rotation of said disk at said second RPM that is lower than said first RPM, and enabling reading of said data pattern at said second RPM, to thereby stress the ability of said read head to fly relative to said disk.

13. The disk drive of claim 12 including;

third means for loading said memory means with third control parameters enabling rotation of said disk at a third RPM that is lower than said second RPM, and enabling reading of said data pattern as said third RPM, a third divide-by command input to said divider circuit enabling said divide circuit to divide said clock by a third factor which is higher than said second factor, said third divide-by factor enabling reading of said data pattern as said third RPM, and said third divide-by factor enabling reading of said data pattern as said third RPM.

14. The disk drive of claim 12 wherein said data circuit is constructed and arranged to respond to a head signal indicative of a general inability of said air-bearing read head to fly relative to said disk when said motor rotating at said second RPM or a third RPM that is lower than said second RPM.

15. The disk drive of claim 14 wherein said air-bearing read head is an MR head having an air bearing characteristic that is altitude sensitive, wherein said first RPM produces an air-bearing at a low altitude, wherein said second RPM produces an air-bearing simulating another altitude that is higher than said low altitude, and wherein said third RPM produces an air-bearing simulating an altitude that is higher than said another altitude.

16. The disk drive of claim 15 wherein said MR head is generally stationary relative to said rotating disk.

17. The disk drive of claim 16 including;

a plurality of said MR heads individual associated with a like plurality of said rigid rotating disks, a like plurality of said data circuits connected one to each of said plurality of heads, and said microprocessor being connected to provide said data circuit parameter to each of said data circuits.

* * * * *